(12) United States Patent
Beley et al.

(10) Patent No.: US 11,321,216 B1
(45) Date of Patent: May 3, 2022

(54) RICH LOGGING OF SIMULATION RESULTS

(71) Applicant: Ansys, Inc., Canonsburg, PA (US)

(72) Inventors: Jean-Daniel Beley, Caluire (FR); Stephane Garreau, Lyons (FR)

(73) Assignee: Ansys, Inc., Canonsburg, PA (US)

( * ) Notice: Subject to any disclaimer, the term of this patent is extended or adjusted under 35 U.S.C. 154(b) by 543 days.

(21) Appl. No.: 16/223,903

(22) Filed: Dec. 18, 2018

Related U.S. Application Data

(60) Provisional application No. 62/608,626, filed on Dec. 21, 2017.

(51) Int. Cl.
   *G06F 11/34* (2006.01)
   *G06F 16/248* (2019.01)
   *G06F 16/242* (2019.01)
   *G06F 30/20* (2020.01)

(52) U.S. Cl.
   CPC ........ *G06F 11/3476* (2013.01); *G06F 16/248* (2019.01); *G06F 16/2448* (2019.01); *G06F 30/20* (2020.01)

(58) Field of Classification Search
   None
   See application file for complete search history.

(56) References Cited

U.S. PATENT DOCUMENTS

| | | | | |
|---|---|---|---|---|
| 2002/0152234 A1* | 10/2002 | Estrada | ................. | G06F 40/174 715/201 |
| 2003/0088564 A1* | 5/2003 | Lohmann | ................. | G06F 16/30 |
| 2007/0299869 A1* | 12/2007 | Clary | ................. | G06F 11/3452 |
| 2010/0274587 A1* | 10/2010 | Gamboa | ............ | G06Q 10/0637 705/3 |
| 2012/0136641 A1* | 5/2012 | Fung | ...................... | G06F 30/23 703/10 |
| 2013/0116989 A1* | 5/2013 | Zhang | ...................... | G06F 8/10 703/2 |
| 2014/0278290 A1* | 9/2014 | Fairbrother | ...... | G06Q 10/06313 703/2 |

* cited by examiner

*Primary Examiner* — Craig C Dorais
(74) *Attorney, Agent, or Firm* — Jones Day (57) ABSTRACT

A computer-implemented method for rich logging of simulation results is disclosed. The method includes running a simulation of a physical process, generating log file entries with contextual attributes about a state of the simulation, storing the log file entries in a database, receiving a query to the database from a client browser referencing a contextual attribute, generating a message from the database in response to the query, and displaying a message in a rich text document on the client browser. Related apparatus, systems, techniques, methods and articles are also described.

22 Claims, 5 Drawing Sheets

FIG. 1

| Record ID | Record Type | Simulation Tool | Global Time | Context 1 | Context 2 | Context 3 |
|---|---|---|---|---|---|---|
| 1 | Event | Fluid | 0.730984143 | Wheel 1 | Stop 1 | Contact Release |
| 2 | Event | Mechanical | 0.547525541 | Screw | Wheel 4 | Open |
| 3 | Alert | Electromagnetic | 0.07774925 | Node 1 | 7.3V | Alarm > 5V |
| 4 | Event | Electromagnetic | 0.073609732 | Heating Element 6 | On | Manual |
| 5 | Alert | Fluid | 0.8340222673 | Probe 1 | 0.68 PSI | Alarm < 0.75 PSI |
| 6 | Event | Mechanical | 0.598240414 | Wheel 4 | Planet 3 | Open |
| 7 | Alert | Mechanical | 0.149627458 | Planetenachse | Planet 1 | Stop Minimum Bound |
| 8 | Error | Fluid | 0.57304537 | Pressure Sensor 3 | Text | Unexpected Type Received |

RICH LOGGING OF SIMULATION RESULTS

CROSS REFERENCE TO RELATED APPLICATIONS

This application claims priority to U.S. Patent Application No. 62/608,626, filed Dec. 21, 2017, the entirety of which is herein incorporated by reference.

TECHNICAL FIELD

The subject matter described herein relates to computer aided engineering (CAE) methods, and more specifically to improving the use of simulation log files by enhancing the content of the log files.

BACKGROUND

Computer aided engineering (CAE) uses computer models of physical processes to predict physical behavior of objects. Evaluating these models under imposed boundary conditions and external inputs, referred to as simulation, provides engineers with valuable insight into important physical parameters such as displacements, stresses, temperatures, heat fluxes, flow velocities, electric currents and charges, and force fields. Simulation tools treat massive amount of data, including large number of simulation entities such as parts, domains, finite elements, and contacts, and large number of simulation steps such as iterations, time, frequency and load steps.

Simulation tools usually log their operations and progress in plain text files, referred to as log files. Log files are typically referred to during and after the completion of the simulation because they provide additional insight into the simulation process. Log files are especially useful when a simulation has not converged or provided unexpected or suspect results. Review of the log file allows the user to modify simulation or design parameters in order to obtain more accurate or more relevant results. The amount of data to write into a log file usually has to be determined upfront, and may vary from a quiet mode to a normal mode to a verbose mode to a debug mode. The appropriate amount of data depends on the complexity of the simulation, the length of the run, the skill and experience of the user, and the planned use of the log file data.

The user setting up the simulation is typically faced with tradeoff between requesting less information to be written into the log file in order to minimize the size of the log file and to make it easier to read and search, and requesting more information to be written into the log file in order to capture all potentially useful events during the simulation and to avoid a need to re-run the simulation if important information has not been recorded. A typical log file will have from a few thousand to a few millions of lines. A large log file, however, may make it impractical to find and read relevant information. If the simulation involves multiple participants—for example a multi-physics simulation based on high performance cluster simulation—the log file may be made of multiple files, forcing the user to navigate between these files to find relevant information without any help to synchronize navigation in these different files. It may be desirable for a user to read the log file at a computer client or at another device different from the cluster or cloud computer performing simulation.

Therefore, there is a need for a method to improve recording, storing, accessing, and manipulating information in a log file. Further, there is a need to resolve the tradeoff between writing too little and too much into a log file. Additionally, there is a need for a convenient way to quickly and easily find relevant information in a large log file from a complex physical simulation or in a set of log files from a multi-physics simulation.

SUMMARY

Computer-implemented methods for logging of simulation results are described. Methods may include running a simulation of a physical process, generating log file entries with contextual attributes about a state of the simulation, storing the log file entries in a database, receiving a query to the database from a client browser referencing a contextual attribute, generating a message from the database in response to the query, and displaying a message in a rich text document on the client browser. Methods may include passing the query through a communication layer between the client browser and a database.

A message from the database may include all messages associated with a contextual attribute. Client browser may have an interactive log display or a display with sort, filter, and/or browse functions. A simulation may include one or more simulation tools. A simulation may be running on one single machine or in a distributed environment. The contextual attributes may include a time stamp, a designation of a simulation tool that generated the information, a nature of the log file entries, a user type, and/or a physical property. The nature of the log file entries may be an informative message, a warning, and/or a fatal error message. The physical property may include information about a physical process. A database may be one or more databases, each storing log file entries from one of the simulation tools. A simulation may include a pre-processing, a solution, and/or a post-processing.

Computer systems with a memory and a processor are also described. A memory may store data such as a database and/or log file entries. A processor may run a simulation of a physical process, generate log file entries with contextual attributes about a state of the simulation by the simulation, store the log file entries in one or more databases, receive a query to a database from a client browser referencing one or more contextual attributes, generate messages from the database in response to the query, and display messages in a rich text document on the client browser. The computer systems may include passing the query through a communication layer between the client browser and a database.

Systems and methods of displaying results of a simulation are also described. In one example, a computer-readable medium is encoded with instructions to command one or more data processors to execute steps of methods that may include rendering an interactive chart in a client browser and displaying a log access window in response to an indication by a pointer. The interactive chart may include an analysis variable axis, a parameter value axis, a plot of a simulation parameter, and a simulation marker. The log access window may include simulation graphics and a log access user interface control. Methods may include opening a new display window in response to selecting a simulation variable. The new display window may have a portion of a log file corresponding to the selected log access user interface control. The simulation marker may be a simulation warning, a beginning event, an end event, and/or a physical event occurring during the simulation. The simulation parameter may include a representation of a physical characteristic of the simulation. The simulation graphics may include a visual representation of the simulation corresponding to a time point indicated by a pointer. The log access user interface control may include an option to go to a log file, an option to go to a simulation object, and/or an option to go to the time point. The portion of the log file may be displayed with hyperlinks, which may be connected to individual messages in the log file.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. These advantages include more efficient simulations, fewer re-runs, more effective use of a log file, lower simulation costs, and more accurate simulation results.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
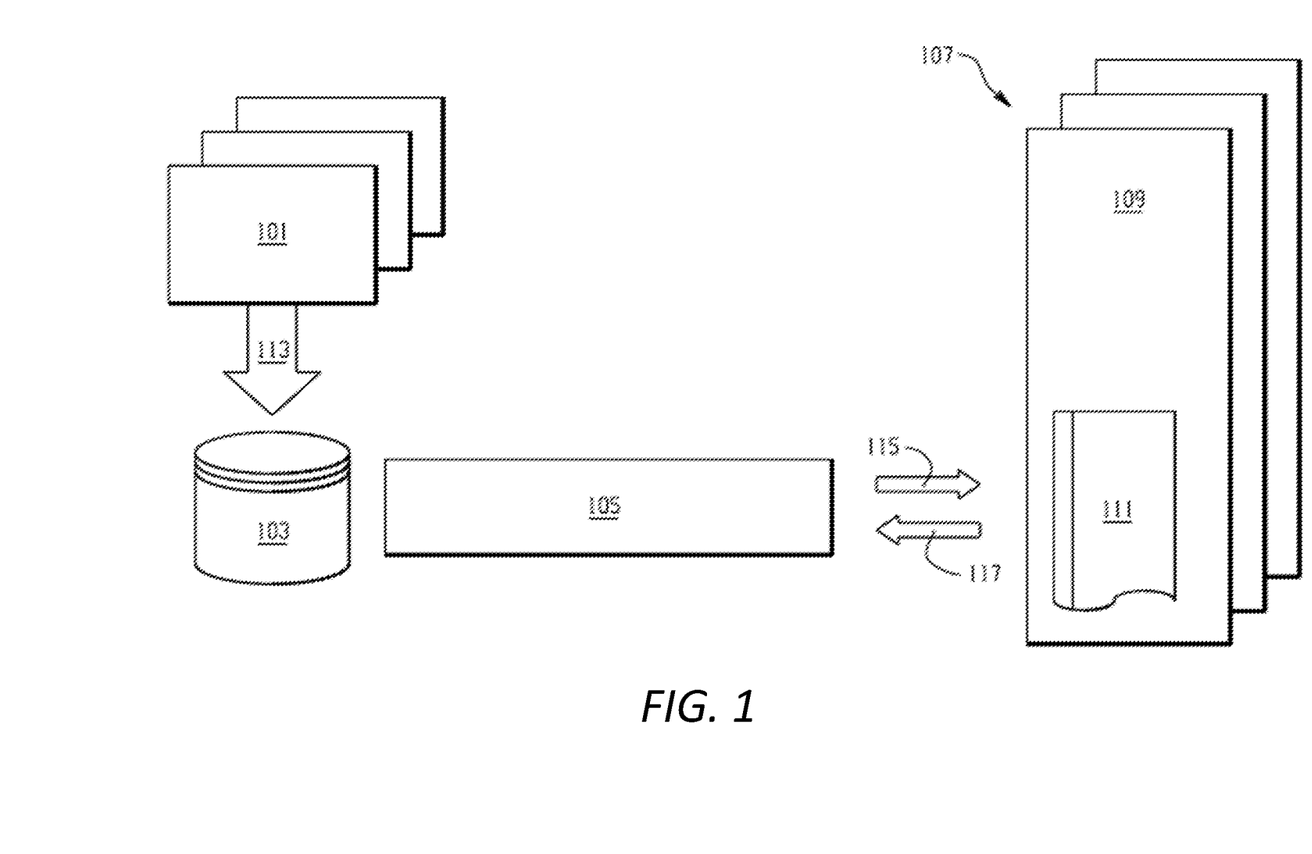
FIG. 1 is a diagram illustrating a method according to one embodiment.

FIG. 1 is a diagram illustrating a method according to one embodiment. According to an embodiment, one or more simulation tools 101 may generate information in a context and context information 113, referred to as log file entries. Simulation tools 101 may include one or more of pre-processing, solution, and post-processing, running on one machine or distributed on one or more clusters. The context information 113 may include messages enriched by context and may be stored in one or more databases 103. An interactive, graphical tool 107 may be used to display the content of enriched messages locally or remotely. Content of the enriched messages may be displayed in a hierarchic and selective manner, or it may be organized along an interactive timeline.

One or more databases 103 may be a common database, or multiple separate databases, depending on performance considerations. Graphical tool 107 may include one or more clients 109. Each of clients 109 may be a web browser, a dedicated tool on a portable device, or a simulation front end. Clients 109 may make queries 117 into databases 103 through a unique communication layer 105 based on user requests for filtering. Databases 103 may return messages 115 through the same communication layer 105 to client, to be displayed in a client browser or front end 109. Clients 109 may display messages 115 in a rich text file 111 including hyperlinks to allow to navigate in and out of the rich text file 111.

Messages 115 may be contextual. This means that instead of being a plain text string, each message 115 may be built as an object containing not only the text of the message, but also its attributes. These attributes may describe one or more of the following: a tool that has produced the message, a time stamp, and a context in which the message was printed, a simulation entity that leads the simulation tool to issue the message. This context may depend on the simulation tool generating the message. The context may be not a simple information. The context may be hierarchical. Some non-limiting examples of context may include one or more of the following: computation of stresses in a structural linear static analysis; computation of contact forces at time=43 seconds in a transient analysis; combination of frequency results in an ASME Code Check post-processing. In some embodiments, the contextual information may be non-native to the tool producing the message. That is, where a tool producing the message may include some log data, a log data context engine may augment a data record including the tool-produced data to include additional contextual data. For example, the log data context engine may populate fields associated with the simulation tool (e.g., an identifier of the particular tool among a plurality of tools participating in a multi-physics simulation) or data associated with a broader process in which the simulation tool is operating (e.g., a global timestamp of the multi-physics simulation associated with a logged event).

Message 115 may include one or more of the following: an informative message, a warning, and a fatal error message. Attributes of the message 115 may include a user type that should see this message. For example, the technical support organization may make some queries 117 that are not intended for a regular end-user. Attributes of the message 115 may include entities attached to the message. For example, a message about a contact pair may have a property that refers to this contact pair. Attributes of the message 115 may include any kind of property specific to the simulation tool generating this message, which can be used to filter or select the message from the whole list of messages produced by the simulation tool.

Log file entries 113 are stored by each participating simulation tool 101 as entries in its assigned database 103 with properties attached to them as attributes. The attributes allow queries 117 to extract selected messages 115 responding to matching criteria. Queries 117, in one example, may be SQL queries, SQL-like queries (e.g., SQLite, MySQL, PostgreSQL, Microsoft SQL Server), or non-relational database query languages (e.g., NoSQL, MongoDB, Cassandra, Redis). For example, a query 117 may allow selecting messages 115 produced between two time stamps, or in a time range of a transient simulation. Combining the selections using multiple attributes may allow to reduce the messages to a short list that is easy to display and read.

Multiple clients 109 may query the database 103 through a communication layer 105. The client 109 may run on the same computer as the database 103, but may also be remote. If the simulation tool 101 is deployed on the cloud, then a client 109 may be a lightweight browser based client that may run on the user thin client. The client 109 may query the simulation node. The client 109 may be a plain text console client, which may produce raw data in a rich text document 111. If the client 109 is a more advanced client with graphical interface, then it may display the rich log file 111 visually.

Figure 2:
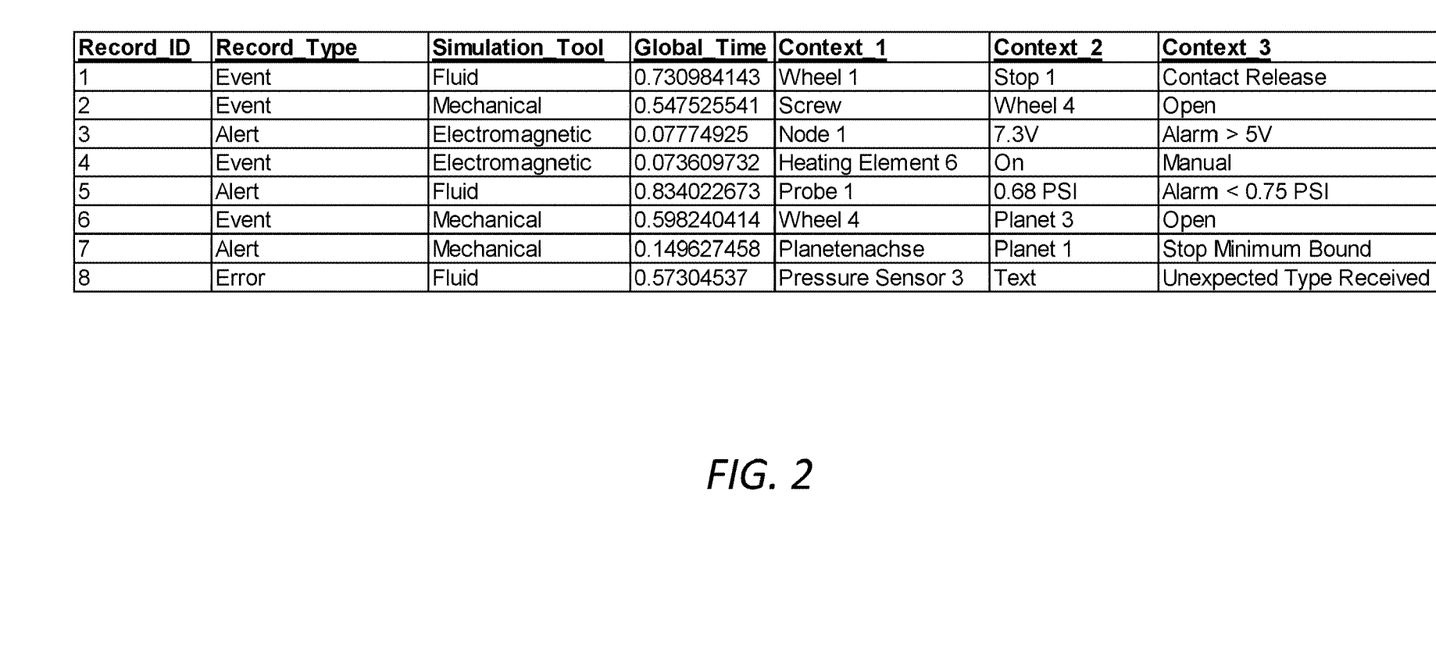
FIG. 2 depicts log data records stored in a database according to one embodiment.

FIG. 2 depicts log data records stored in a database (e.g., database 103) according to one embodiment. In the example of FIG. 2, a multi-physics simulation is executing that compiles contributions from multiple simulation tools. In this example, the multi-physics simulation includes data from a fluid simulation tool, a mechanical simulation tool, and an electromagnetic simulation tool. In one embodiment, the simulation tool communicate with one another via status messages. For example, the turning of a wheel in the mechanical tool to open a valve to release liquid held behind the valve will have a result in pressures throughout a system, as measurable by the fluid tool. The status of the wheel turning may be communicated from the mechanical tool to the fluid tool. While message passing may require some coordination of processing across the simulation tool, it does not require synchronization of processing, whereby all simulation tools would run at the same time on a same global timeline. Thus, events passed to a central log data repository may be received at the repository in a different order than their occurrence in the global simulation.

The database implementation of FIG. 2 enables the timing of log data to be reconciled across simulation tools regardless of any timing of when that log data is received at the database. The example log data records include a Record ID, which is a unique identifier assigned when log data is received from one of the simulation tools. A Record Type field indicates a type of log data that is stored in that log data record. Example record types include "Event" records indicating events of interest in the multi-physics simulation, "Alert" records that indicate conditions in the multi-physics simulation including user-specified conditions (e.g., log an alert when Node 1>5V), and "Error" records that describe error conditions in the simulation. The Simulation Tool field identifies from which simulation tool log data originated, and a Global Time field indicates at what time in the overarching multi-physics simulation the log data of the record is associated.

In one embodiment, the combination of the Record Type and the Simulation Tool field values dictates the meaning of one or more additional context fields, labeled Context_1, Context_2, and Context_3 in the example of FIG. 2. For example, as illustrated in Record_ID 1, when the Record Type is an Event and the Simulation Tool is the fluid tool, Context 1 corresponds to a first entity in the fluid simulation, Context 2 corresponds to a second entity in the fluid simulation, and Context 3 corresponds to a relationship between the first and second entity. Events in the mechanical tool are similarly represented in records, as illustrated at Record ID 2 and 6. But an Event in the electromagnetic tool stores different data in the context fields. As indicated in Record ID 4, such an event identifies a simulation entity in Context 1, a state of that entity in Context 2, and the impetus for that state change (e.g., manual user intervention) in Context 3. Regarding alerts, an alert for the electromechanical tool results in a simulation entity (e.g., Node 1) being represented in the Context 1 field, a state of the simulation entity being stored in Context 2, and the alarm that was triggered being stored in Context 3. This is illustrated in Record ID 3 for the electromagnetic tool, and data from the fluid tool is similarly stored in Record ID 5. Mechanical alerts are stored differently, where Context 1 identifies a first simulation entity, Context 2 identifies a second simulation entity, and Context 3 describes a relationship between the first and second simulation entities that resulted in the alert as illustrated in Record ID 3. Error records may also be included in the log data. Record ID 8 indicates an error that occurred in the Fluid Tool, where the Pressure Sensor 3 object received text data as an input, where that object was expecting data of a real-value type.

The storage of rich log data, as illustrated in the example of FIG. 2, enables enhanced queries that can quickly locate log data of interest. For example, a user could query and access all log data associated with the Fluid Tool to analyze performance by that tool. Or the user could query all log data associated with the Contact Release of Record ID 1 and 0.20 seconds after as represented in the Global Time field to analyze only log data associated with that window. Or a user looking to perform debug functions could query all error log data to correct such errors (e.g., by changing simulation setup) for a next run of the multi-physics simulation.

Figure 3:
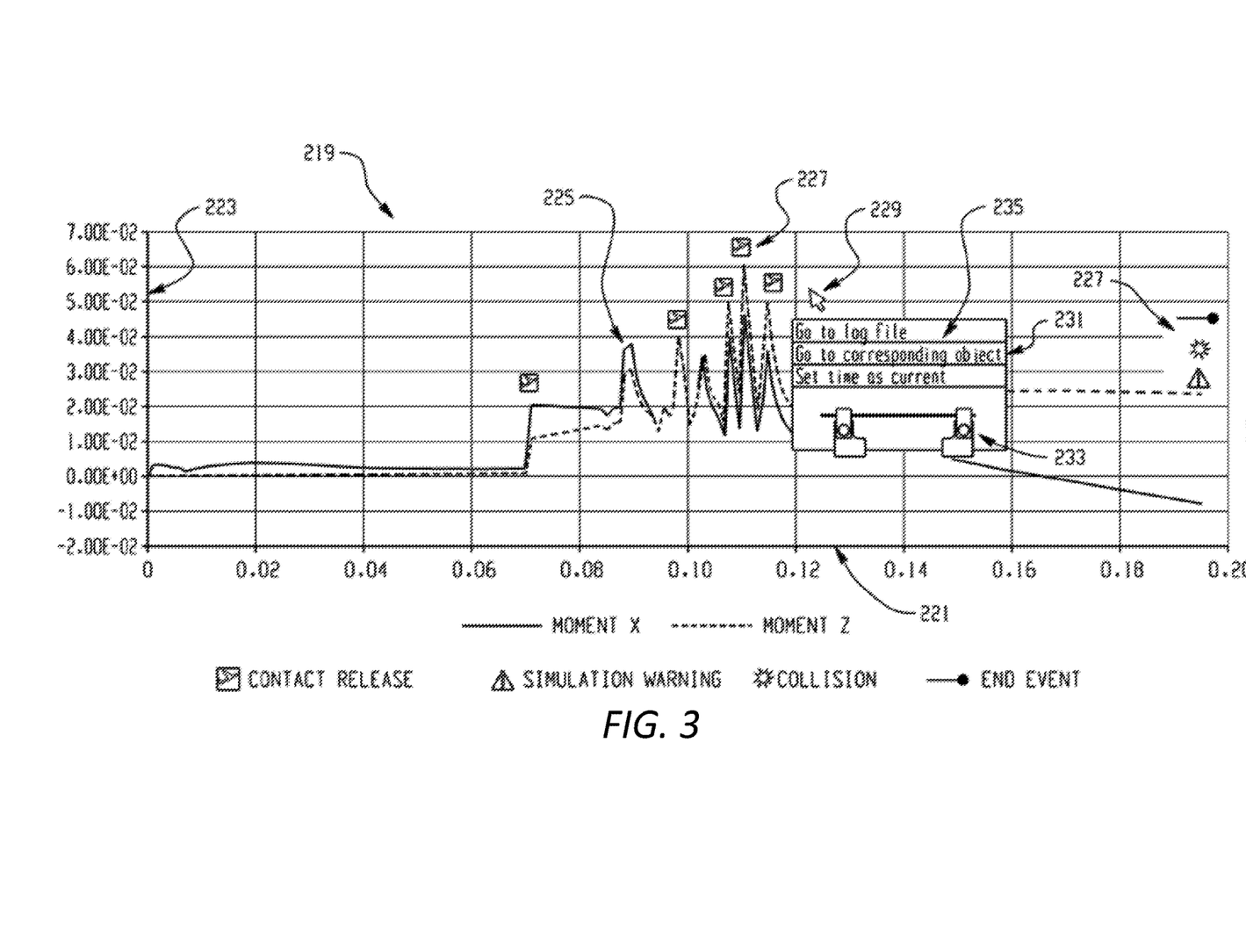
FIG. 3 shows a diagram illustrating a user interface that can trigger a query to the database to access a rich log file.

Data from a log data database can be accessed in a variety of ways. For example, a user may enter parameters of a query of the database 103 directly, such as via entry of a text string or using a graphical user interface to build a search using a query building aid. Additionally, a query can be automatically generated based on user actions taken interacting with a user interface. FIG. 3 shows a diagram illustrating a user interface that can trigger a query to the database to access a rich log file 111. An interactive timeline 219 may allow the user to navigate in the simulation time 221, to select and re-select ranges. This timeline 219 may be based on charts, which may be populated with simulation data and events (e.g., events indicated in the database 103) relevant to the simulation. The user may navigate in the text of the log file 111 and in the timeline 219 in a combined manner. A plot 225 may represent one or more simulation parameters, and may be selected by the user.

Chart 219 may be a two dimensional chart with an x-axis 221 and a y-axis 223. The x-axis 221 may represent simulation time. Chart 219 may display the full range of simulation time, or a portion of the full simulation time, or any other analysis variable such as frequency or the simulation step, depending on the user's selection. The y-axis 223 may represent a parameter value, or multiple parameter values. The range of the y-axis 223 may be a full range of the parameter value during simulation or a portion of the full range of a parameter value, depending on the user's selection. Plot 225 may include one or more parameters, which may represent physical characteristics of the simulation.

Chart 219 may have one or more simulation markers 227. Simulation markers 227 may represent one or more of the following: simulation warnings, beginning and end events, and physical events occurring during simulation. Examples of such physical events in a mechanical simulation may be a collision and a contact release. As described above with reference to FIG. 2, events, warnings, and errors may be associated with records in the log database 103.

The user may access additional details about simulation parameters from the log file by positioning a pointer 229 over, or next to, the desired section of the plot 225. The user may point to a particular portion of the plot 225 based on the position on the time axis 221, or based on a value on the parameter value axis 223, or based on a feature of interest on the plot 225, or based on a simulation marker 227.

When the pointer 229 is positioned over, or next to, a section of the plot 225, a log access window 231 may be displayed in the chart 219. The log access window 231 may have simulation graphics 233, which may be a graphical representation of the physical model at the corresponding position during simulation. The log access window 231 may have one or more log access user interface controls 235, which may assist the user in navigating to the appropriate portion of the rich log file. Log access user interface controls 235 may include menu options such as "Go to log file," "Go to corresponding object," "Set time as current." Log access user interface controls may allow the user to access a specific line or set of lines in the rich log file, or to extract information from the rich log files that is relevant to a specific component of the simulation model, or to compile all information from the rich log file that represents simulation parameters at a given moment in time or a given time period.

Figure 4:
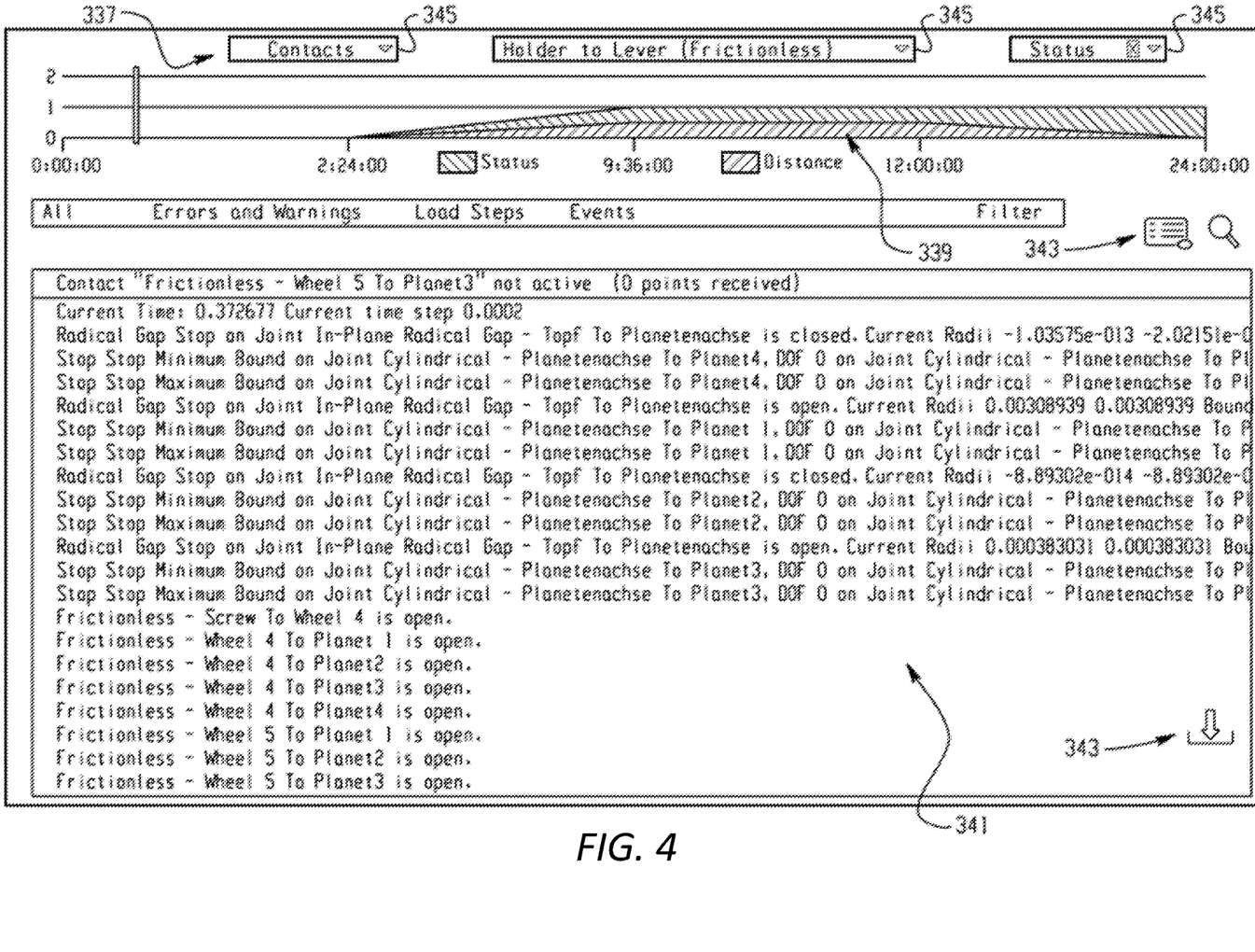
FIG. 4 is a diagram illustrating an example of a display of a portion of a rich log file according to one embodiment.

FIG. 4 is a diagram illustrating an example of a display of a portion of a rich log file according to one embodiment (e.g., such as upon selection of the "Go to log file" log access user interface control in FIG. 3). A portion of the rich log file may be displayed in a window 341 together with a menu bar 337, status bar 339, and search, filter, and export tools 343. The menu bar 337 may include buttons 345 to allow the user to extract or display a subset of the rich log file. Menu buttons 345 may be dependent on type of simulation tools used. Availability of menu options on the menu bar 337 may be context dependent, which means that selection of one of the menu buttons 345 may affect availability of other menu buttons. Once the user has made menu selections, the corresponding entries from the rich log file are displayed in the window 341.

The status bar 339 may provide visual guidance to the user to select a desired time portion of the simulation. When such selection is made the window 34 may display a portion of the rich log file corresponding to that selected time period. The search tools 343 may assist the user in further down selecting the portion of the rich log file that is of interest to the user. Examples of search tools 343 include a zoom, a text search, and a download.

The window 343 may represent a text area, which may be made of rich text with hyperlinks and with filters. This may allow the user to select messages from the rich log file based on selected criteria. When the client is the simulation front-end, the hyperlinks can directly lead to the corresponding entities of the simulation model. For example, if the log file is produced by ANSYS Rigid Dynamics simulation tool, and the front end is ANSYS Mechanical user interface, then the user can navigate from a given contact pair hyperlink in the rich log file to the corresponding object in the Mechanical tree.

Figure 5:
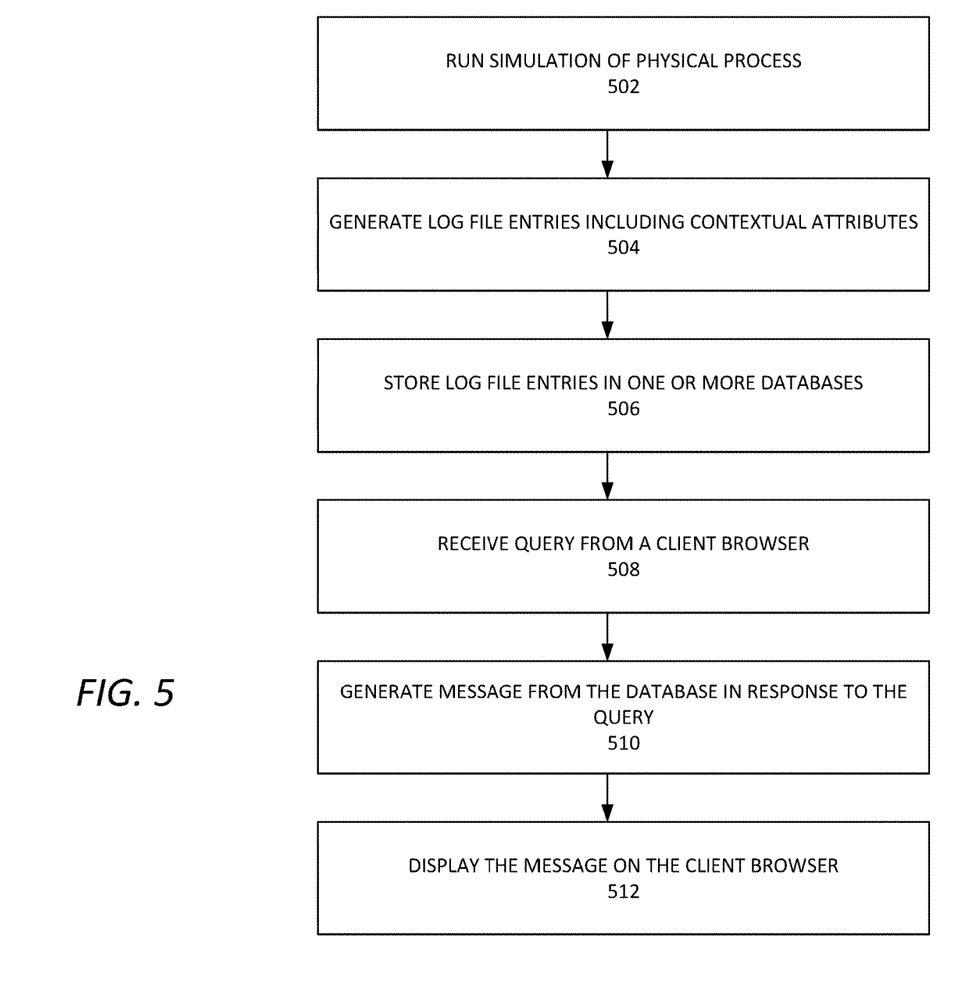
FIG. 5 is a flow diagram depicting a processor-implemented method for logging simulation results according to one embodiment.

FIG. 5 is a flow diagram depicting a processor-implemented method for logging of simulation results. At 502, a simulation of a physical process is run and log file entries with contextual attributes about a state of the simulation are generated at 504. At 506, the log file entries are stored in a database, and a query to the database is received at 508 from a client browser referencing a contextual attribute. At 510, a message is generated from the database in response to the query, and the message is displayed in a document on the client browser at 512.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. In particular embodiments, a non-transitory computer- or machine-readable medium may be encoded with instructions in the form of machine instructions, hyper-text markup language based instructions, or other applicable instructions to cause one or more data processors to perform operations. As used herein, the term "machine-readable medium" (or "computer-readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for logging of simulation results, comprising:
    running a computer aided engineering (CAE) software program executing multi-physics simulation of a physical process that compiles contributions from each of a plurality of multi-physics simulation tools, the multi-physics simulation tools comprising two or more of: a fluid simulation tool, a mechanical tool, or an electromagnetic simulation tool, the multi-physics simulation tools characterizing physical parameters including displacements, stresses, electric currents and charges, or force fields;
    generating, by the simulation, log file entries about a state of the simulation, the log file entries comprising a plurality of contextual attributes, wherein at least one database includes one or more records, each record having a field indicating which of the plurality of multi-physics tool generated the log file entries in the record;
    storing the log file entries in the at least one database;
    receiving a query to the at least one database from a client browser, the query referencing at least one of the plurality of contextual attributes;
    generating, in response to the query, at least one message from the at least one database; and
    displaying the at least one message in a rich text document on the client browser.

2. The method of claim 1, wherein the multi-physics simulation is performed based on the plurality of simulation tools.

3. The method of claim 2, wherein the field comprises an identifier of the simulation tool associated with the record.

4. The method of claim 1, wherein each record in the at least one database includes a record type, a global time, and one or more additional fields.

5. The method of claim 1, wherein each record in the at least one database includes a record type field and a plurality of context fields, wherein a meaning of each of the plurality of context fields differs depending on a value of the record type field.

6. The method of claim 1, wherein the plurality of contextual attributes comprises one or more of the following: a time stamp, a designation of one of the plurality of simulation tools that generated the information, a nature of the log file entries, a user type, a physical property.

7. The method of claim 1, further comprising passing the query through a communication layer between the client browser and the at least one database.

8. The method of claim 1, wherein the at least one message from the at least one database comprises all messages associated with the at least one of the plurality of contextual attributes.

9. The method of claim 1, wherein the client browser comprises an interactive log display, the display comprising sort, filter, and browse functions.

10. The method of claim 9, wherein the nature of the log file entries comprises one or more of the following: an informative message, a warning, or a fatal error message.

11. The method of claim 6, wherein the physical property comprises information about the physical process.

12. The method of claim 1, wherein the at least one database comprises a plurality of databases, each of the plurality of databases storing log file entries from one of the plurality of simulation tools.

13. The method of claim 1, wherein the simulation comprises a pre-processing, a solution, and a post-processing.

14. The method of claim 1, wherein the query is an SQL query.

15. A computer system comprising:
    a memory comprising at least one database and log file entries; and
    a processor to:
        run a computer aided engineering (CAE) software program executing a multi-physics simulation of a physical process that compiles contributions from each of a plurality of multi-physics simulation tools, the multi-physics simulation tools comprising two or more of: a fluid simulation tool, a mechanical tool, or an electromagnetic simulation tool, the multi-physics simulation tools characterizing physical parameters including displacements, stresses, electric currents and charges, or force fields;
        generate, by the simulation, the log file entries about a state of the simulation, the log file entries each comprising a plurality of contextual attributes including which of the plurality of multi-physics tool generated the corresponding log file entry;
        store the log file entries in the at least one database;
        receive a query to the at least one database from a client browser, the query referencing at least one of the plurality of contextual attributes;
        generate, in response to the query, at least one message from the at least one database; and
        display the at least one message in a rich text document on the client browser.

16. A computer-readable storage medium encoded with instructions for commanding one or more data processors to execute steps of a method of displaying results of a simulation, the steps comprising:
    receive a query to the at least one database from a client browser, the query referencing at least one of a plurality of contextual attributes associated with a multi-physics simulation being executed by computer aided engineering (CAE) software program that compiles contributions from each of a plurality of multi-physics simulation tools, the multi-physics simulation tools comprising two or more of: a fluid simulation tool, a mechanical tool, or an electromagnetic simulation tool, the multi-physics simulation tools characterizing physical parameters including displacements, stresses, electric currents and charges, or force fields;

rendering an interactive chart in a client browser that characterizes a multi-physics simulation responsive the query, the interactive chart comprising:

an analysis variable axis;

a parameter value axis;

a plot of at least one simulation parameter; and at least one simulation marker; and displaying a log access window in response to an indication by a pointer, the log access window comprising:

a simulation graphic visualizing the multi-physics simulation responsive to the query; and at least one log access user interface control.

17. The computer-readable storage medium of claim 16, the steps further comprising:

opening a new display window in response to selecting at least one simulation variable, wherein the new display window comprises a portion of a log file corresponding to the selected at least one log access user interface control.

18. The computer-readable storage medium of claim 17, wherein the portion of the log file is displayed with hyperlinks, the hyperlinks connected to individual messages in the log file.

19. The computer-readable storage medium of claim 16, wherein the at least one simulation marker comprises a simulation warning, a beginning event, an end event, and a physical event occurring during the simulation.

20. The computer-readable storage medium of claim 16, wherein the at least one simulation parameter comprises a representation of a physical characteristic of the simulation.

21. The computer-readable storage medium of claim 16, wherein the simulation graphic comprises a visual representation of the simulation corresponding to a time point indicated by the pointer.

22. The computer-readable storage medium of claim 16, wherein the at least one log access user interface controls comprises an option to go to the log file, an option to go to a simulation object, and an option to go to the time point.

\* \* \* \* \*